(12) United States Patent
Kawamura et al.

(10) Patent No.: US 6,378,557 B2
(45) Date of Patent: Apr. 30, 2002

(54) PRESSURE REGULATION VALVE

(75) Inventors: Maki Kawamura, Kariya; Haruhiko Uno, Okazaki; Hiroyuki Nakane, Oakazaki; Motoyoshi Ando, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/819,857

(22) Filed: Mar. 29, 2001

(30) Foreign Application Priority Data

Mar. 30, 2000 (JP) ........................................ 2000-093966

(51) Int. Cl.$^7$ ............................................. F15B 13/043
(52) U.S. Cl. ................. 137/625.64; 91/433; 192/109 F
(58) Field of Search ...................... 137/625.64; 91/433; 192/109 F

(56) References Cited

U.S. PATENT DOCUMENTS

| 4,899,785 | A | * | 2/1990 | Inokuchi |
| 5,505,287 | A | * | 4/1996 | Asatsuke et al. |
| 5,911,244 | A | * | 6/1999 | Long et al. ............ 137/625.64 |
| 5,924,539 | A | * | 7/1999 | Braun et al. ........... 137/625.64 |

* cited by examiner

*Primary Examiner*—Gerald A. Michalsky
(74) *Attorney, Agent, or Firm*—Nixon & Vanderhye P.C.

(57) ABSTRACT

In a pressure regulation valve having a main spool and a sub-spool slidably housed in the main spool, the main spool is at a position where pilot pressure force balances with a sum of pressure force of a feedback chamber and spring biasing force, when the pilot pressure is below a given value, so that normal output pressure proportional to pilot pressure is supplied to a hydraulic servo for driving a clutch of an automatic transmission, and, when the pilot pressure exceeds the given value, the sub-spool moves to a position where the feedback chamber communicates with a drain so that the main spool moves to a position where maximum output pressure equal to supply pressure source is supplied.

6 Claims, 7 Drawing Sheets

PRESSURE REGULATION VALVE

CROSS REFERENCE TO RELATED APPLICATION

This application is based upon and claims the benefit of priority of Japanese Patent Application No. 2000-93966 filed on Mar. 30, 2000, the content of which is incorporated herein by reference.

BACKGROUND OF THE INVENTION

1. Field of the Invention

The present invention relates to a pressure regulation valve whose output pressure variable characteristics that is changed over between pressure proportional to pilot pressure and pressure equal to supply pressure.

2. Description of Related Art

Conventionally, as shown in FIG. 7, is known a hydraulic circuit system having a pressure regulation valve 107 for adjusting output pressure to be applied to a hydraulic circuit 101 into control pressure proportional to pilot pressure. The hydraulic circuit 101 communicates with a hydraulic servo 100 for driving a hydraulic engagement member constituting a hydraulic multiple disk clutch (hereinafter called clutch) which serves to engage components with each other in a planetary gear device arranged between an input and output axes of a vehicle automatic transmission.

The hydraulic circuit system is provided with a pilot pressure control valve 104 driven by a solenoid valve 103, a shift valve whose valve position is shifted upon receiving modulator pressure output from a modulator valve 105, and a pressure regulation valve 107 for adjusting output pressure. The solenoid valve 103 is composed of a solenoid coil 131, a coil bobbin 132, a stator core 133, a moving core 134, a solenoid shaft 135, a yoke 136, a plate spring 137 and a cover 138.

The pilot pressure control valve 104 has a spool 141 that is slidably housed in a valve body 110 and moves to communicate a pilot pressure conduit 111 either with a conduit 112, to which modulator pressure from the modulator 105 is applied, or with a conduit 113, which communicates with a drain 109. One end of the spool 141 receives force from the solenoid valve 103 upon its operation and the other end of the spool 141 is urged in an opposite direction to which force from the solenoid valve 103 is applied by biasing force of a spring 143 whose one end is held by the other end of the spool 141 and whose another end is held by a plug 142.

The shift valve 106 has a spool 161 that is slidably housed in the valve body 110 and serves to change the output pressure to be applied to the pressure regulation valve 107. The spool 161 is urged in a direction opposite to receiving pilot pressure to be input into a pilot pressure feedback chamber 164 by biasing force of a spring 163 whose one end is held by a stopper 162 and whose another end is held by the spool 161. A conduit 165 is a drain port communicating with the drain 109. The other end of the spool 161 receives the modulator pressure through the conduit 112.

The pressure regulation valve 107 has a spool 171 that is slidably housed in the valve body and moves so that the hydraulic circuit 101 communicates with a conduit 114 for a pressure supply source 102 or with a conduit 115 for the drain 109. The spool 171 is urged in an opposite direction to which the pilot pressure is applied by biasing force of a spring 173 whose one end is held by the spool 171 and whose another end is held by the valve body 110. Conduits 174 and 175 are drain ports communicating with the drain 109. The other end of the spool 171 receives the output pressure from the shift valve 106.

In the conventional hydraulic circuit system mentioned above, the pressure regulation valve 107 adjusts the output pressure (pressure to the clutch) either to pressure proportional to the pilot pressure at a time of clutch engagement control during which it is required to accurately control pressure to be applied to the servo 100 for driving the clutch or to higher pressure with which the clutch never slides even if higher torque is applied thereto at a time after the clutch engagement control.

In more details, according to increase of the pilot pressure input to the pilot pressure feedback chamber 164, the spool 161 of the shift valve 106 moves toward a left side in FIG. 7 so that the drain port 165 is opened and the output pressure of the shift valve 106, which the other end of the spool 171 of the pressure regulation valve 107 receives, becomes zero. Accordingly, the spool 171 moves rapidly up to a left end in FIG. 7 so that pressure equal to higher pressure from the pressure supply source 102 is applied to the hydraulic circuit 101.

Since the conventional hydraulic circuit system has the pilot pressure control valve 104 and the shift valve 106 in addition to the pressure regulation valve 107, an entire body thereof becomes larger.

Further, there is another conventional system having a pressure regulation valve whose pressure amplitude ratio is remarkably high so that higher pressure is secured at a time after the clutch engagement control. However, in this system, it is very difficult to accurately and precisely control the pressure to the clutch, which results in adversely affecting on driving feeling at a time of transmission stage change.

SUMMARY OF THE INVENTION

An object of the invention is to provide a compact pressure regulation valve for a hydraulic circuit in which an output pressure is accurately regulated to pressure proportional to pilot pressure at a relatively low pressure region where linear pressure control is required and to pressure directly supplied from a pressure supply source at a relatively high pressure region where maximum pressure is required.

To achieve the above object, a pressure regulation valve for a hydraulic circuit is composed of a housing having an input port to communicate with a supply pressure source, an output port to communicate with the hydraulic circuit and at least a drain port to communicate with a drain, a pilot pressure producing member supplying pilot pressure, which increases from zero to a value exceeding a given value, to the housing, a pipe shaped first spool accommodated slidably in the housing so as to receive the pilot pressure, a first biasing member giving the first spool biasing force acting in an opposite direction to receiving the pilot pressure, a feedback hydraulic chamber provided in the housing, a second spool accommodated slidably inside the first spool so as to receive the pilot pressure, and a second biasing member giving the second spool second biasing force acting in an opposite direction to receiving the pilot pressure.

With the pressure regulation valve mentioned above, the first spool is moved in the housing by first thrust force due to the pilot pressure so that the output port communicates internally with the drain port, when the pilot pressure is substantially zero, and communicates internally with the input port, when the pilot pressure exceeds the given value.

Further, the second spool is movable in the first spool by second thrust force due to the pilot pressure so that the feedback hydraulic chamber communicates internally with the output port, when the pilot pressure is below the given value, and communicates internally with the drain port, when the pilot pressure exceeds the given value.

Furthermore, the feedback hydraulic chamber gives the first spool feedback force acting in an opposite direction to which the first spool receives the pilot pressure when the feedback hydraulic chamber communicates with the output port.

The first spool moves in the housing to a position where the first thrust force balances with a sum of the first biasing force and the feedback force. When the pilot pressure is within a range from substantially zero to the given value, a normal output pressure proportional to the pilot pressure is supplied from the output port to the hydraulic circuit, since the feedback hydraulic chamber communicates with the output port and the feedback force is given to the first spool.

When the pilot pressure is in a range exceeding the given value, a maximum output pressure equal to supply pressure of the supply pressure source, which-is higher by a predetermined value (for example, 0.7 Mpa) than the normal pressure, is supplied from the output port to the hydraulic circuit, since the feedback hydraulic chamber communicates with the drain so that the feedback force becomes zero and the first spool further moves to a position where the input port communicates with the supply pressure source.

As the pressure regulation valve has the second spool housed in the first spool for controlling the movement of the first spool, an entire body constituting the hydraulic circuit becomes compact and results in less manufacturing cost.

Further, to make the entire body of the hydraulic circuit more compact, it is preferable that the pilot pressure producing member is a pilot pressure control valve being provided with a third spool that is arranged coaxially with the first spool and a valve housing formed integrally with the housing.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

Figure 1:
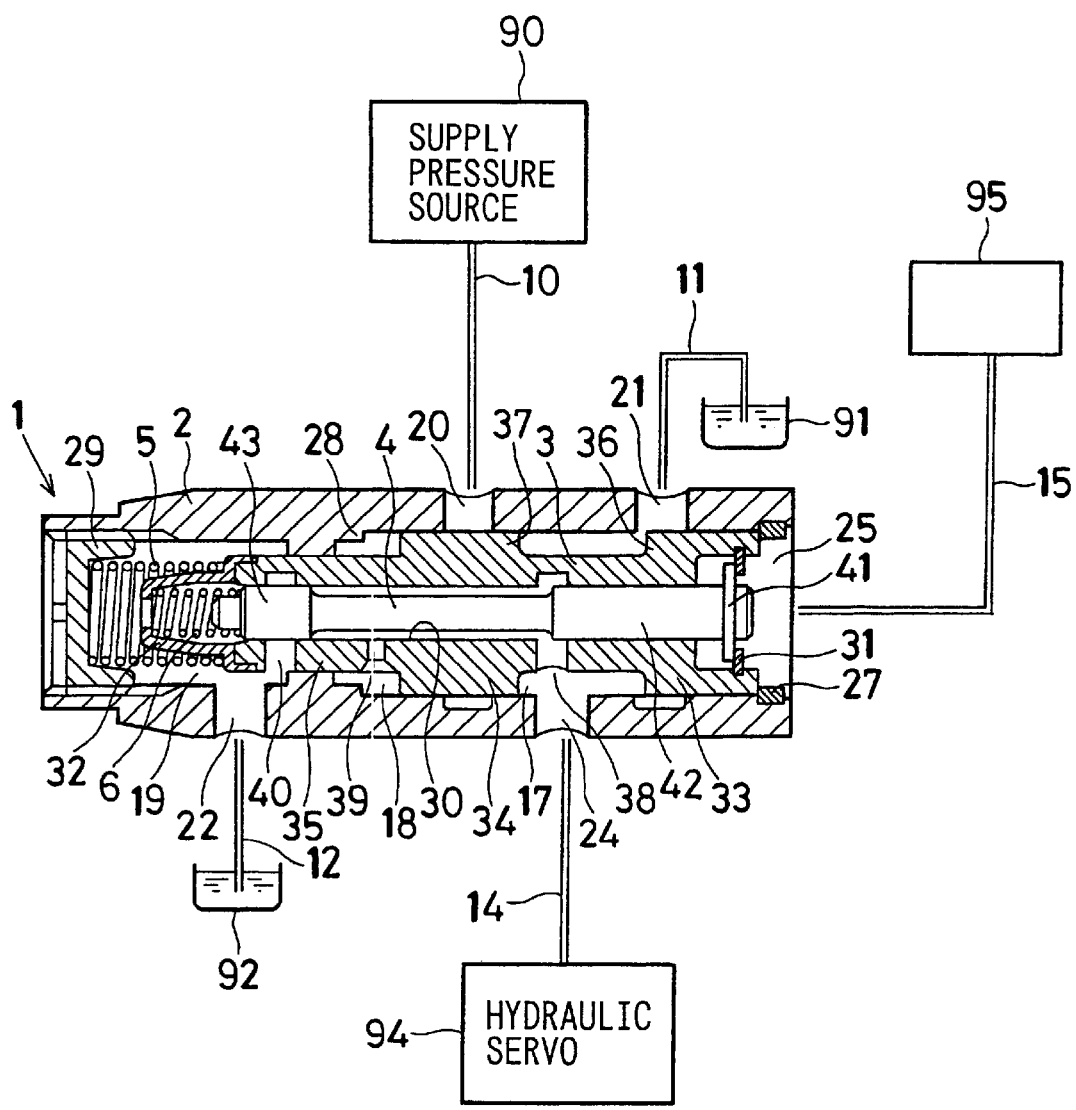
FIG. 1 is a cross sectional view of a pressure regulation valve having variable characteristics according to a first embodiment of the present invention.

DETAILED DESCRIPTION OF THE PREFERRED EMBODIMENTS (First Embodiment)

A hydraulic circuit system having a pressure regulation valve with variable characteristics according to a first embodiment is described with reference to FIGS. 1 to 3.

According to the first embodiment, a hydraulic control device of a vehicle automatic transmission has a hydraulic circuit system in which a pressure regulation valve 1 with variable characteristics supplies both of output pressure proportional to pilot pressure and output pressure equal to supply pressure (line pressure) of a supply pressure source 90 to an output conduit 14 (hydraulic circuit). The output conduit 14 is an oil conduit communicating the pressure regulation valve 1 with a hydraulic servo 94 for driving a hydraulic engagement member (for example, a clutch) of the vehicle automatic transmission.

The hydraulic engagement member is a multiple disk friction clutch in which transmission gears provided between input and output axes of the vehicle automatic transmission are selectively engaged with each other for changing a transmission ratio. An oil pump, which is driven by an engine and operative to intake operating oil via an oil strainer from an oil reservoir and to discharge it to a supply pressure (line pressure) conduit 10, is used as the supply pressure source 90. Conduits 11 and 12 are drain conduits (low pressure) communicating with first and second drains 91 and 92 such as oil reservoirs provided in an oil pan.

The pressure regulation valve 1 is provided with a pilot pressure control valve 95 for outputting pilot pressure, a pipe shaped housing 2 lodged in a recess, which is provided at a given position of a valve body (not shown) constituting the hydraulic circuit system of the automatic transmission, a cylindrical main spool 3 slidably accommodated in the housing 2, a sub-spool 4 accommodated in the main spool 3, a first spring 5 biasing the main spool 3 toward a first position (initial position), and a second spring 6 biasing the sub-spool 4 toward a first position (initial position). According to the first embodiment, the pilot pressure control valve 95 is a normally closed linear solenoid valve but may be a normally opened linear solenoid valve.

An output hydraulic chamber 17 (circumferential groove around an outer circumference of the main spool 3) is formed between the housing 2 and the main spool 3. Further, a feedback hydraulic chamber 18 (circumferential groove around an outer circumference of the main spool 3) and a second drain hydraulic chamber 19 are formed between the housing 2 and the main spool 3, respectively.

The housing 2 of the pressure regulation valve 2 is provided with a supply pressure port (input port) 20 communicating with the supply pressure conduit 10 of the supply pressure source 90, first and second drain ports 21 and 22 communicating with the drain conduits 11 and 12 of the first and second drains 91 and 92, respectively, and a clutch pressure output port 24 (output port) communicating with the hydraulic circuit 14 (output conduit). The housing 2 is further provided at a right end thereof shown in FIG. 1 with a pilot pressure port 25 communicating with a pilot pressure supply conduit 15 that communicates with the normally closed linear solenoid valve 95.

The housing 2 is provided on an inner wall thereof with a first stopper 27 defining the first position of the main spool 3, a second stopper 28 defining a second position of the main spool 3, and a male screw type plug 29, which is fastened and fixed thereto at a left end thereof shown in FIG. 1, for presetting a spring load of the first spring 5.

The normally closed linear solenoid valve 95, which is a pilot pressure producing member, is composed of a solenoid coil, stator core (fixed iron core), moving core (movable iron core), a solenoid shaft, yoke and a housing, which are not shown in drawings. The solenoid valve 95 is operative to output the pilot pressure to be applied via the pilot pressure supply conduit 15 to the pilot pressure port 25. The pilot pressure increases in proportion to increase of current supplied to the solenoid coil from an electric control unit (not shown), as shown in FIGS. 2 and 3.

The main spool 3 together with the housing 2 constitutes a three ports change over valve for operating in such a manner that the output conduit 14 is allowed to communicate with the supply pressure source 90 or with the first drain 91. The main spool 30 is provided in an inside thereof with a cylindrical bore 30 extending axially and moves toward a left side in FIG. 1 (a direction in which the pilot pressure acts) when the pilot pressure exceeds biasing force of the second spring 6. A sub-spool stopper 31, which defines the initial position (first position) of the sub-spool 4, is provided at an end of the cylindrical bore 30. A cylindrical retainer 32 is provided at the other end of the cylindrical bore 30.

The main spool 3 is provided at outer circumference thereof with large diameter lands 33 and 34 and a small diameter land, which extend axially, respectively. The large diameter lands 33 and 34 serve to adjust opening degrees of the first drain port 21 and supply pressure port 20, respectively. The first stopper 27, which stops the large diameter land 33, defines the first position of the main spool 3. The second stopper 28, which stops the large diameter land 34, defines the second position of the main spool 3. First and second edges 36 and 37 are formed on surfaces where the large diameter lands 33 and 34 are opposed each other.

The main spool 3 is further provided at a cylindrical wall thereof with an inner output port 38 through which the clutch pressure output port 24 communicates with the cylindrical bore 30, a feedback port 39 through which the feedback hydraulic chamber 18 communicates with the cylindrical bore 30, and an inner drain port 40 through which the second drain port 22 communicates with the cylindrical bore 30. The inner output port 38 is opened to a recess between the large diameter lands 33 and 34. The feedback port 39 is opened between the large diameter land 34 and the small diameter land 35. The inner drain port 40 is opened on the other end side of the small diameter land 35.

The sub-spool 4 constitutes a three ports change over valve for operating in such a manner that the feedback hydraulic chamber 18 communicates either with the output conduit 14 or with the second drain 92. The sub-spool 4 is slidably housed in the cylindrical bore 30 and moves toward a left side in FIG. 1 (a direction in which the pilot pressure acts) up to a second position when the pilot pressure exceeds biasing force of the second spring 6.

A plate type stopper ring 41, which comes in contact with the sub-spool stopper 31, is attached to an end of the sub-spool 4. The sub-spool 4 is provided at outer circumference thereof with lands 42 and 43 both extending axially. A recess is formed in the cylindrical bore 30 between a cylindrical portion axially bridging the lands 42 and 43 and a cylindrical inner wall of the main spool 3.

The feedback hydraulic chamber 18 is formed axially between the large diameter land 34 and a circumferentially projecting portion protruded out of the cylindrical inner wall of the housing 2 and radially between the small diameter land 35 and the cylindrical inner wall of the housing 2. The feedback hydraulic chamber 18 is a pilot pressure-opposing chamber that gives the large diameter land 34 of the main spool 3 biasing force acting against the pilot pressure (in a right direction in FIG. 1).

When the sub-spool 4 is at the first position, the clutch output pressure is introduced in the feedback hydraulic chamber 18. When the sub-spool 4 is at the second position, the feedback hydraulic chamber 18 communicates with the drain conduit 12 of the second drain 92.

The first spring 5, whose end is held by the retainer 32 installed at the other end of the main spool 3 and whose another end is held by the plug 29 installed at the other end of the cylindrical wall of the housing 2, is a first biasing member. The first spring 5 is a coil spring and gives the main spool 3 biasing force acting against the pilot pressure (in a right direction in FIG. 1).

The second spring 6, whose end is held by the land 43 provided at the other end of the sub-spool 4 and whose another end is held by the retainer 32 installed at the other end of the main spool 3, is a second biasing member. The second spring 6 is a coil spring and gives the sub-spool 4 biasing force acting against the pilot pressure (in a right direction in FIG. 1). According to the first embodiment, the biasing force of the second spring 6 is so set that the output pressure is changed over when the pilot pressure reaches 0.5 Mpa.

According to the hydraulic circuit system mentioned above, the main spool 3 and the sub-spool 4 are moved toward the pilot pressure port 25 by the biasing forces of the first and second springs 5 and 6 and, when the pilot pressure is zero, are at first positions, respectively. That is, the large diameter land 33 of the main spool 3 is in contact with the first stopper and the stopper ring 41 of the sub-spool 4 is in contact with the sub-stopper 31.

Unless the pilot pressure of the pilot pressure port 25 exceeds a predetermined pressure When current is applied to the normally closed linear solenoid valve 95, the sub-spool 4 maintains the first position since the biasing force of the second spring 6 exceeds thrusting force in a left direction in FIG. 1 due to the pilot pressure. When the pilot pressure exceeds the predetermined pressure, the sub-spool 4 moves to the second position on a side of the second spring 6.

In a case that the pilot pressure is controlled within a range from zero to 0.6 Mpa, the biasing force of the second spring 6 is so set that the output pressure is changed over when the pilot pressure reaches 0.5 Mpa.

Accordingly, when the pilot pressure is within a range from zero to 0.5 Mpa, the sub-spool 4 is kept at the first position since the biasing force of the second spring 6 exceeds thrust force in a left direction in FIG. 1 due to the pilot pressure. At this time, the feedback hydraulic chamber 18 communicates with the output conduit 14 through a route of the clutch output port 24, the output hydraulic chamber 17, the inner output port 38, the cylindrical bore 30, and the feedback port 39 so that the clutch output pressure is introduced to the feedback hydraulic chamber 18.

Therefore, the main spool 3 moves to a position where the thrust force acting in a left direction in FIG. 1 due to the pilot pressure balances with a sum of feedback force acting in a right direction in FIG. 1 due to the output pressure and the biasing force of the first spring 5. At this position, the main spool 3 is operative to supply the output pressure, which is adjusted according to the pilot pressure, via the output conduit 14 to the hydraulic servo 94 for the clutch.

Figure 2:
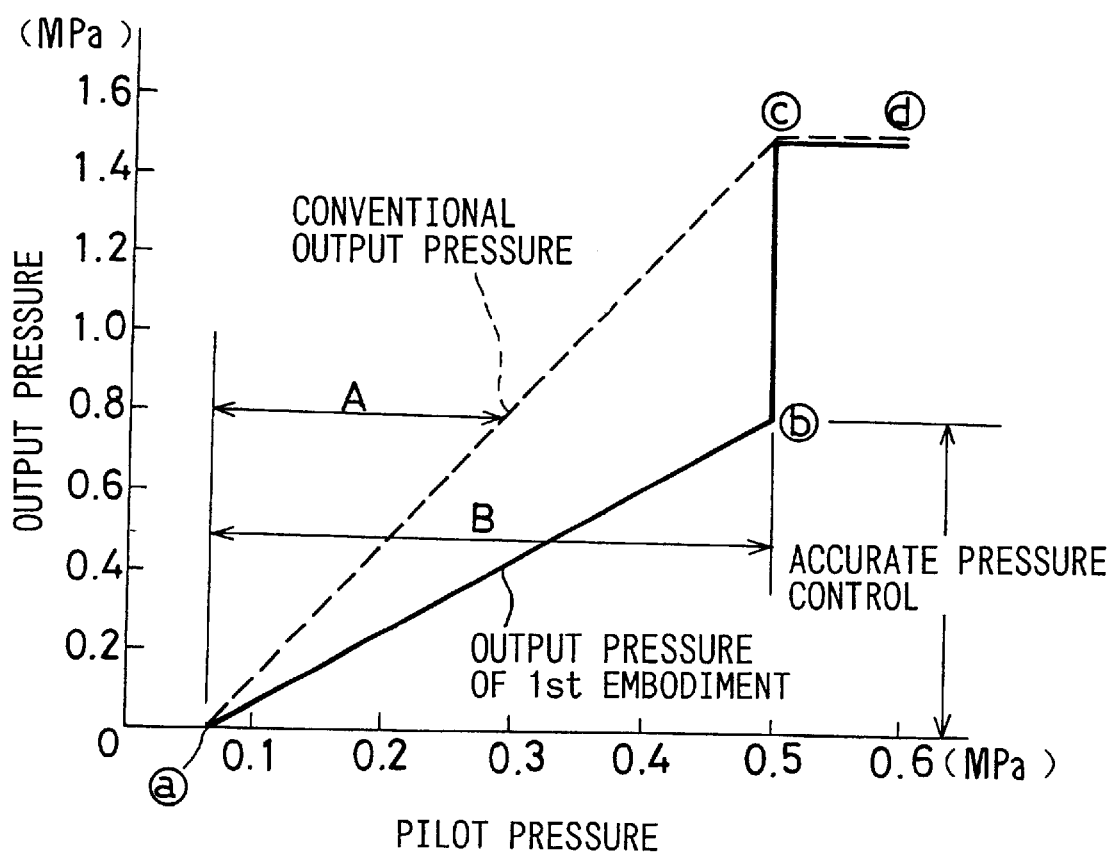
FIG. 2 is a graph showing a relationship between output pressure of the pressure regulation valve and the pilot pressure.
Figure 3:
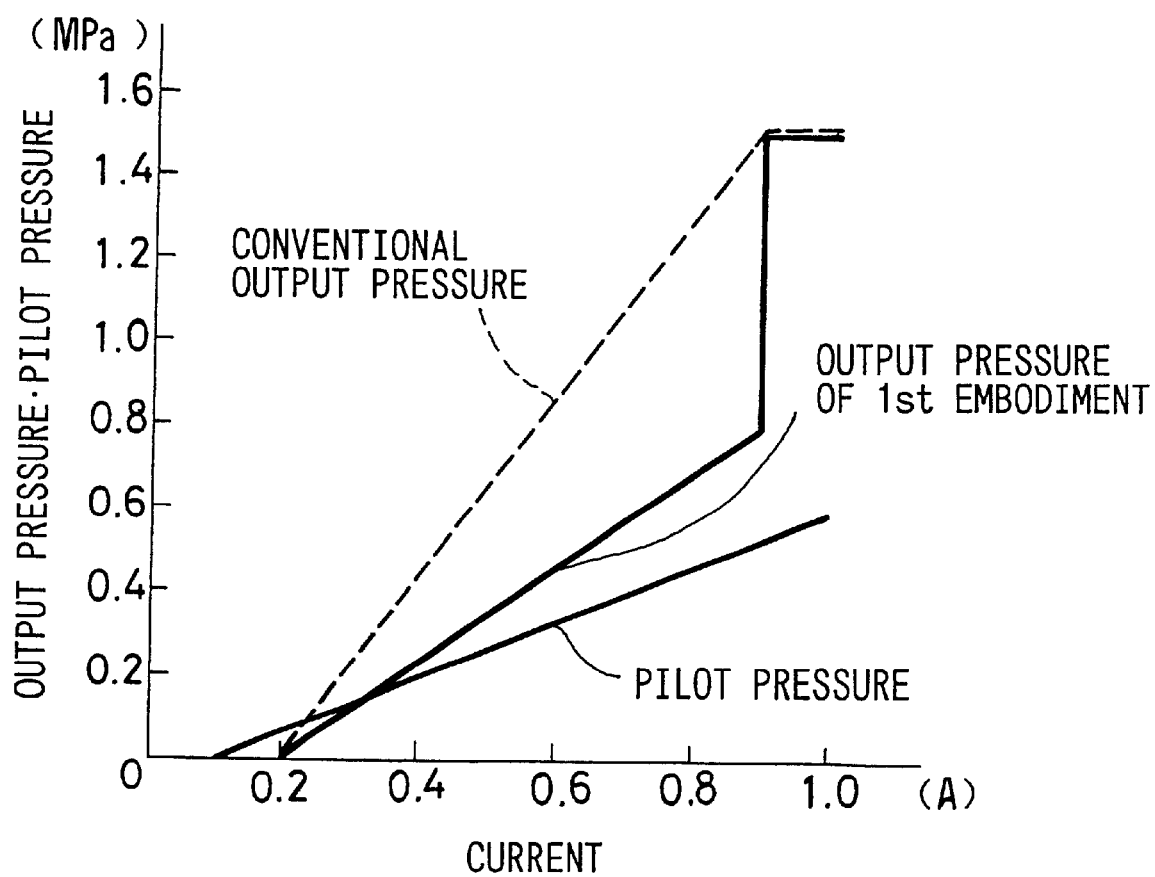
FIG. 3 is a graph showing relationships among current of a linear solenoid valve, pilot pressure and the output pressure.

When the pilot pressure is a given value (for example, 0.5 Mpa), the output pressure supplied to the output conduit is adjusted to a value (for example, 0.8 Mpa) that is proportional to the given value of the pilot pressure and lower by a predetermined value (for example, 0.7 Mpa) than a value (for example, 1.5 Mpa) of maximum pressure, as shown in a graph ⓐ–ⓑ in FIG. 2. The value of the output pressure according to the first embodiment is lower by a predetermined value than that of the output pressure of the conventional pressure regulation valve. That is, increasing gradient of the output pressure that increases according to increase of the pilot pressure is gentler than that of the conventional output pressure.

The output pressure (main control pressure: Pout) can be expressed as a formula mentioned below. Since the output pressure of the pressure regulation valve according to the first embodiment is lower, compared with the output pressure of the conventional pressure regulation valve, the clutch control pressure proportional to the pilot pressure may be precisely and accurately adjusted.

$$Pout = \{(Sp/Sf) \times Ppilot\} - (Fs1/Sf)$$

Where

Sp is an area of the main spool 3 which receives pilot pressure,

Sf is an area of the main spool 3 which receives pressure of the feedback hydraulic chamber 18, Ppilot is pilot pressure, and Fs1 is biasing force of the first spring 5.

Sp/Sf means pressure amplitude ratio.

When the pilot pressure is in a range exceeding 0.5 Mpa (relatively high pressure range), force which the end of the sub-spool 4 receives from the pilot pressure exceeds the biasing force of the second spring 6 so that the sub-spool 4 moves to the second position on a side of the second spring 6. At this time, the feedback hydraulic chamber 18 communicates via the feedback port 39, the cylindrical bore 30, the inner drain port 40, the second drain chamber 19 and the second drain port 22 with the drain conduit 12.

Accordingly, the feedback pressure of the feedback hydraulic chamber 18 becomes zero so that the main spool 3 is moved by the thrust force acting in a left direction in FIG. 1 due to the pilot pressure until the main spool 3 comes in contact with the second stopper 28. Thus, the supply pressure port 20 communicates with the clutch output port 24 so that the output pressure in the output conduit 14 is equal to the supply pressure of the supply pressure source 90.

FIG. 2 is a graph showing a relationship between the pilot pressure and the output pressure of the pressure regulation valve based on the pilot pressure. FIG. 3 is a graph showing a relationship among the current of the linear solenoid valve, the pilot pressure produced by the linear solenoid valve and the output pressure of the pressure regulation valve.

As shown in a solid line, as characteristics of the pressure regulation valve, the output pressure increases in proportion to the pilot pressure, as shown in marks ⓐ and ⓑ, within a pilot pressure range from zero to 0.5 Mpa and maintains pressure equal to the supply pressure, as shown by marks ⓒ and ⓓ, during a pilot pressure range exceeding 0.5 Mpa. A dotted line shown in FIG. 2 represents the output pressure of the conventional pressure regulation valve having a larger pressure amplitude ratio as its characteristics.

According to the conventional pressure regulation valve, in a range where the accurate output pressure control is required, a pilot pressure range is relatively narrow as shown in a letter A, compared with relatively narrow pilot pressure range shown in a letter B in case of the pressure regulation valve according to the present embodiment. Further, the pressure regulation valve according to the present embodiment can output the high output pressure equal to the supply pressure as shown in marks ⓒ and ⓓ. Accordingly, Compared with the conventional pressure regulation valve in which a slight change of the pilot pressure tends to be largely amplified, the pressure regulation valve of the present embodiment results in securing smoother speed change so that the driver's feel for the transmission stage change is improved since the clutch control output pressure proportional to the pilot pressure is more precisely transmitted to the hydraulic servo 94.

As mentioned above, a single piece of the pressure regulation valve of the present embodiment is compact and has two kinds of variable output characteristics so that the output pressure supplied to the clutch is adjusted to pressure proportional to the pilot pressure with a relatively low pressure amplitude ratio in a relatively low pressure range and is adjusted to high pressure directly introduced from the pressure supply source 90 in a high pressure range after the clutch engagement control in order to suppress a slip of the clutch even if large torque is applied thereto. As a result, an entire body of the hydraulic circuit system for the automatic transmission is compact and a number of components thereof are limited so that a manufacturing cost of the hydraulic circuit system is saved.

(Second Embodiment)

A second embodiment of the present invention is described with reference to FIGS. 4 and 5.

According to the second embodiment, a pressure regulation valve 1 having variable characteristics and a pilot pressure control valve 9 (normally closed solenoid valve) are integrated into a body to constitute an electromagnetic valve. The pilot pressure control valve 9 has a cylindrical yoke 51 fixed to an end of a first housing 2a of the pressure regulation valve 1, a coil bobbin 52 arranged on an inner circumference of the yoke 51 and a solenoid coil 53 wound on the coil bobbin 52.

Further, the pilot pressure control valve 9 has a stator core 54 (fixed iron core) arranged on an inner circumference side of the coil bobbin 52, a moving core 55 (movable iron core or plunger), a solenoid shaft operative together with the moving core 55, a pilot pressure control spool 57 arranged coaxially with a main spool 3, a sub-spool 4 and the solenoid shaft 56 and movable together with the solenoid shaft 56, a plate spring 58 for centering the moving core 55, cover 59 closing an opening of an end of the yoke 51, and a third spring 7 biasing in an opposite direction to which pilot pressure acts.

The pressure regulation valve 1 is provided on an end of the first housing 2a with a pilot pressure hydraulic chamber 63 in which a second plug 62 is disposed, a third drain port 23 communicating with a drain conduit 13 of a third drain 93, and a modulator pressure input port 26 communicating with a modulator pressure supply conduit 16 of a modulator valve 96. The modulator valve 96 is a pressure control valve for generating module pressure (for example, 0.6 Mpa), which is lower than supply pressure (line pressure), in the modulator pressure supply conduit 16. A pilot pressure feedback hydraulic chamber 64 is formed between the pilot pressure control valve 57 and the first housing 2a.

Figure 4:
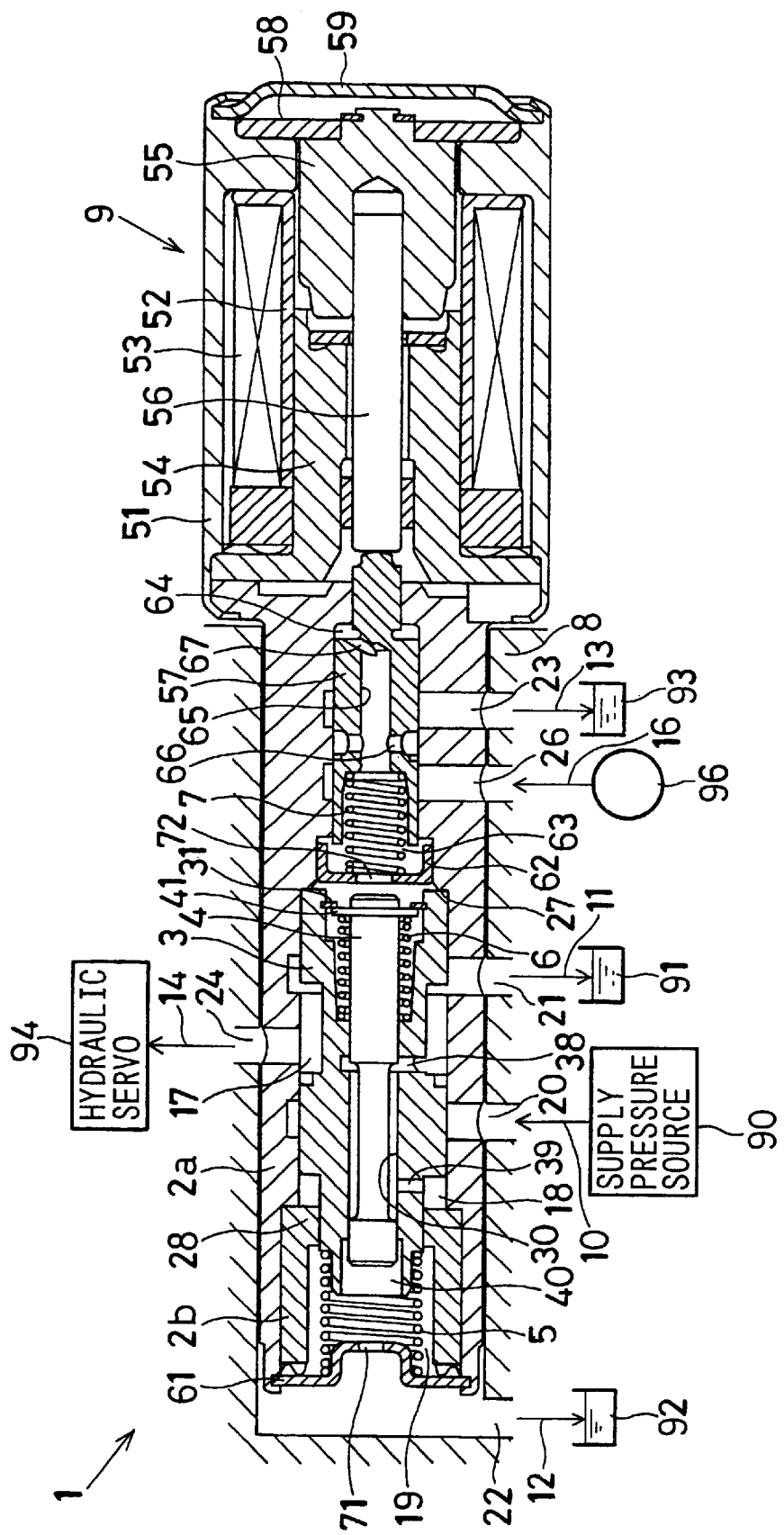
FIG. 4 is a cross sectional view of an electromagnetic valve in which a pressure regulation valve and a pilot pressure control valve are integrated into a body according to a second embodiment of the present invention.
Figure 5:
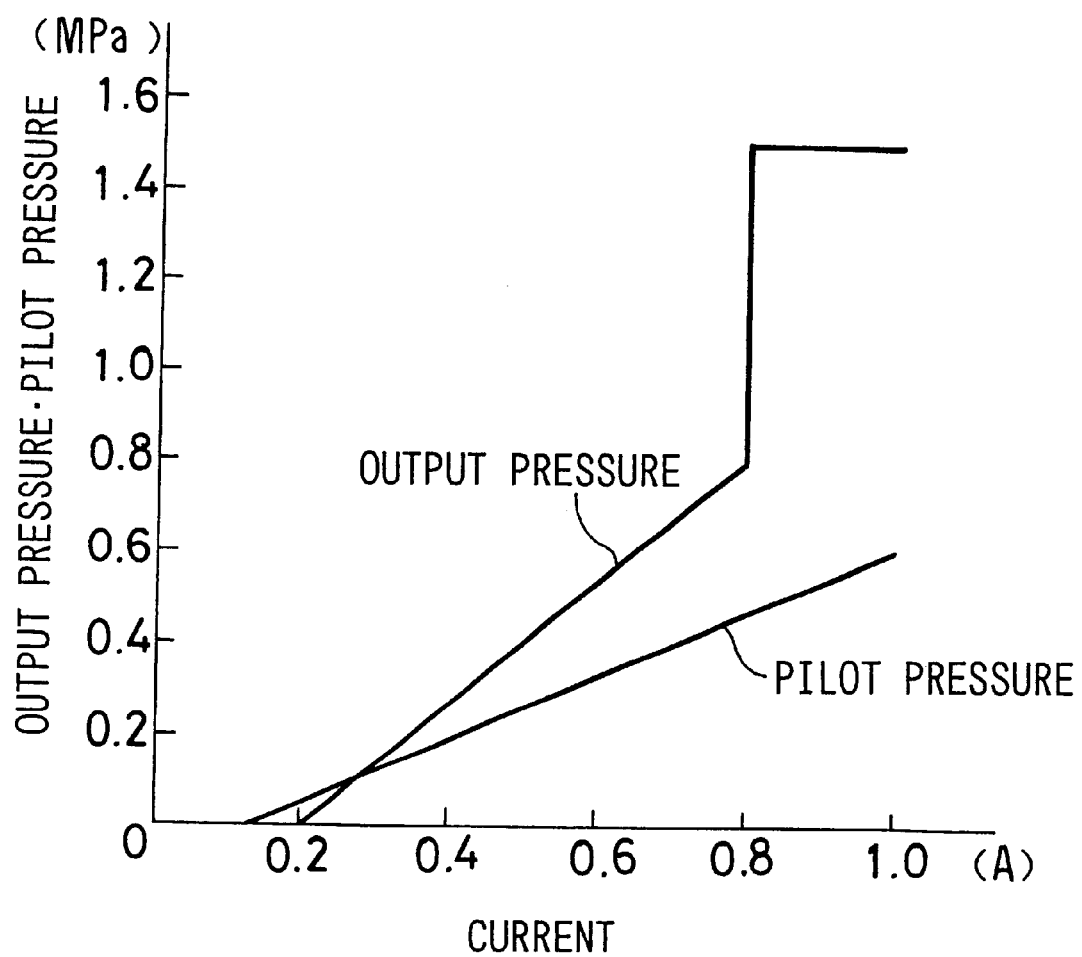
FIG. 5 is a graph showing a relationship between current applied to a pilot pressure control valve and pilot pressure or output pressure of a pressure regulation valve according to a third embodiment of the present invention.

The pilot pressure control valve 57, which has an axial bore 65, moves in a left direction in FIG. 4 (a direction to which the pilot pressure acts) when urging force to the solenoid shaft 56 exceeds biasing force of the third spring 7. The pilot pressure control valve 57 is provided on a cylindrical wall thereof with an inner control port 66 through which the axial bore 65 communicates either with the third drain port 23 or with the modulator pressure input port 26, and with a pilot pressure feedback port 67 through which the axial bore 65 communicates with the pilot pressure feedback hydraulic chamber 64.

The pressure regulation valve 1 of the second embodiment, similar to that of the first embodiment, is composed of cylindrical first and second housings 2a and 2b, the main spool 3, the sub-spool 4, first and second springs 5 and 6, an output hydraulic chamber 17 (a circumferential groove around an outer circumference of the main spool 3), a feedback hydraulic chamber (a circumferential groove around an outer circumference of the main spool 3), and a second drain hydraulic chamber 19.

The first housing 2a is lodged in a recess formed at a given position of a valve body in which the hydraulic circuit system of the automatic transmission is formed. A first plug 61 is fixed by staking to the other end of The first housing 2a. The first housing 2a is provided with a supply port 20 communicating with a supply pressure conduit of a supply pressure source 90, a clutch pressure output port 24 communicating with a hydraulic circuit 14, and a first drain port 21 communicating with a drain conduit 11 of a first drain 91. The second housing 2b is press fitted to an inner circumferential surface of the first housing 2a. A second drain port 22 communicating with a drain conduit 12 of a second drain 92 is provided inside the second housing 2b.

A first stopper 27, which defines first position of the main spool 3, is provided on an inner wall of the first housing 2a. A second stopper 28, which defines second position of the main spool 3, is provided at an end of the second housing 2b. The main spool 3 is provided with an inner drain port 40 opened at the other end thereof to communicate the second drain port 22 with a cylindrical bore 30. Inner diameter of the inner drain port 40 is larger than that of the cylindrical bore 30. The main spool 3 and the sub-spool 4 are arranged coaxially with the solenoid shaft 56 and the pilot pressure control spool 57.

The first plug 61, which is used for presetting the biasing force of the first spring 5, is inserted into the other end inner circumferential surface of the first housing 2a and fixed thereto by staking. The first plug 61 is provided in a center thereof with a communicating bore 71 communicating opposite second drain ports 22 with each other. The second plug 62, which is used for presetting the biasing force of the third spring 7, is press fitted and fixed to an inner circumferential end surface of the first housing 2a. The second plug 62 is provided in a center thereof with a communicating bore 72 communicating opposite pilot pressure hydraulic chambers 63 with each other.

An end of the first spring 5 is held by a step portion at the other end of the main spool 3 and the other end thereof is held by the first plug 61. An end of the second spring 6 is held by a stopper ring 41 fixed to the end of the sub-spool 4 and the other end thereof is held by a recess portion provided at the end of the sub-spool. An end of the third spring 7, which is a return spring (third biasing member) urging the moving coil 55, the solenoid shaft 56 and the pilot pressure control valve toward respective initial positions, is held by a recess of the pilot pressure control spool 57 and the other end thereof is held by the second plug.

With the electromagnetic valve mentioned above, according to increase of current to be supplied to the solenoid coil 53 of the pilot pressure control valve 9, the moving core 55, the solenoid shaft 56 and the pilot pressure control spool 57 move in a left direction in FIG. 4 and, when the axial hole 65 of the pilot pressure control spool 57 communicates with the modulator pressure input port 26, operating oil is flown into the pilot pressure hydraulic chamber 63 so that pressure in the pilot pressure hydraulic chamber 63, that is, pilot pressure, increases.

At this time, the pilot pressure feedback hydraulic chamber 64 communicates with the modulator pressure supply conduit of the modulator valve 96 via the modulator pressure input port 26, the inner control port 66, the axial bore 65, and the pilot pressure feedback port 67, while the pilot pressure feedback hydraulic chamber 64 communicates with the pilot pressure hydraulic chamber 63 via the axial bore 65 and the pilot pressure feedback port 67. Pressure introduced into the pilot pressure feedback hydraulic chamber 64 gives the pilot pressure control spool 57 feedback thrust force acting in an opposite direction (in a right direction in FIG. 4) to which the pilot pressure gives thrusting force thereto. Accordingly, the pilot pressure control spool 57 moves to a position where a sum of the feedback force of the pilot pressure feedback hydraulic chamber 64 and the biasing force of the third spring 3 balance with the pilot pressure of the pilot pressure hydraulic chamber 63. As a result, the pilot pressure in proportion to a current amount applied to the solenoid coil 53 is produced, as shown in FIG. 5.

Unless the pilot pressure of the pilot pressure hydraulic chamber 63 exceeds a predetermined pressure when current is applied to the solenoid coil 53, the sub-spool 4 maintains the first position since the biasing force of the second spring 6 exceeds thrust force in a left direction in FIG. 4 due to the pilot pressure. When the pilot pressure exceeds the predetermined pressure, the sub-spool 4 moves to the second position on a side of the second spring 6. The biasing force of the second spring 6 is so set that the output pressure is changed to the supply pressure when the pilot pressure is 0.5 Mpa.

Accordingly, when the pilot pressure is within a range from zero to 0.5 Mpa (relatively low pressure range), the sub-spool 4 is kept at the first position since the biasing force of the second spring 6 exceeds thrust force in a left direction in FIG. 4 due to the pilot pressure. At this time, the feedback hydraulic chamber 18 communicates with the output conduit 14 through a route of the clutch output port 24, the output hydraulic chamber 17, the inner output port 38, the cylindrical bore 30, and the feedback port 39 so that the clutch output pressure is introduced to the feedback hydraulic chamber 18, which is similar to the first embodiment.

Therefore, the main spool 3, as does in the first embodiment, moves to a position where the thrust force acting in a left direction in FIG. 4 due to the pilot pressure balances with a sum of feedback force acting in a right direction in FIG. 4 due to the output pressure and the biasing force of the first spring 5. At this position, the main spool 3 is operative to supply the output pressure, which is adjusted in proportion to the pilot pressure as shown in FIG. 5, via the output conduit 14 to the hydraulic servo 94 for the clutch.

When the pilot pressure is in a range exceeding 0.5 Mpa (relatively high pressure range), a force which the end of the sub-spool 4 receives from the pilot pressure exceeds the biasing force of the second spring 6 so that the sub-spool 4 moves to the second position on a side of the second spring 6. At this time, the feedback hydraulic chamber 18 communicates, similarly with the first embodiment, via the feedback port 39, the cylindrical bore 30, the inner drain port 40, the second drain chamber 19 and the second drain port 22 with the drain conduit 12.

Accordingly, the feedback pressure of the feedback hydraulic chamber 18 becomes zero so that the main spool 3 is moved by the thrust force acting in a left direction in FIG. 4 due to the pilot pressure until the main spool 3 comes in contact with the second stopper 28. Thus, the supply pressure port 20 communicates with the clutch output port 24 so that the output pressure in the output conduit 14 is equal to the supply pressure of the supply pressure source 90, as shown in FIG. 5.

The pressure regulation valve 1 according to the second embodiment, which has same function and advantages as the first embodiment, is arranged coaxially with the pilot pressure control valve 9 and the housing 2a thereof is commonly used for the pilot pressure control valve 9. Accordingly, an entire body of the hydraulic circuit system of the automatic transmission is remarkably minimized with a less number of components constituting the same, resulting in lower manufacturing cost.

(Third Embodiment)

Figure 6:
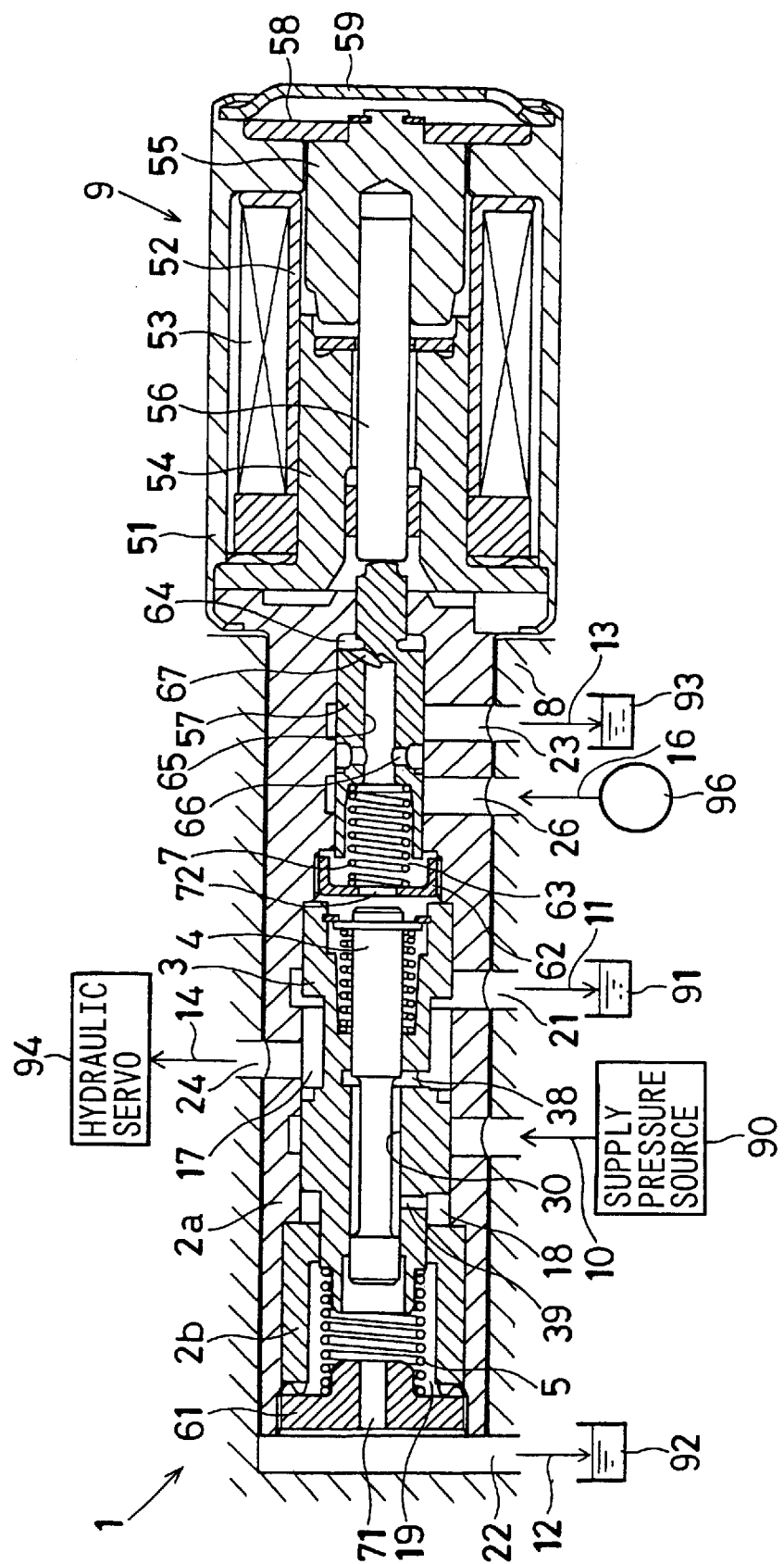
FIG. 6 is a cross sectional view of an electromagnetic valve in which a pressure regulation valve and a pilot pressure control valve are integrated into a body according to a third embodiment of the present invention.
Figure 7:
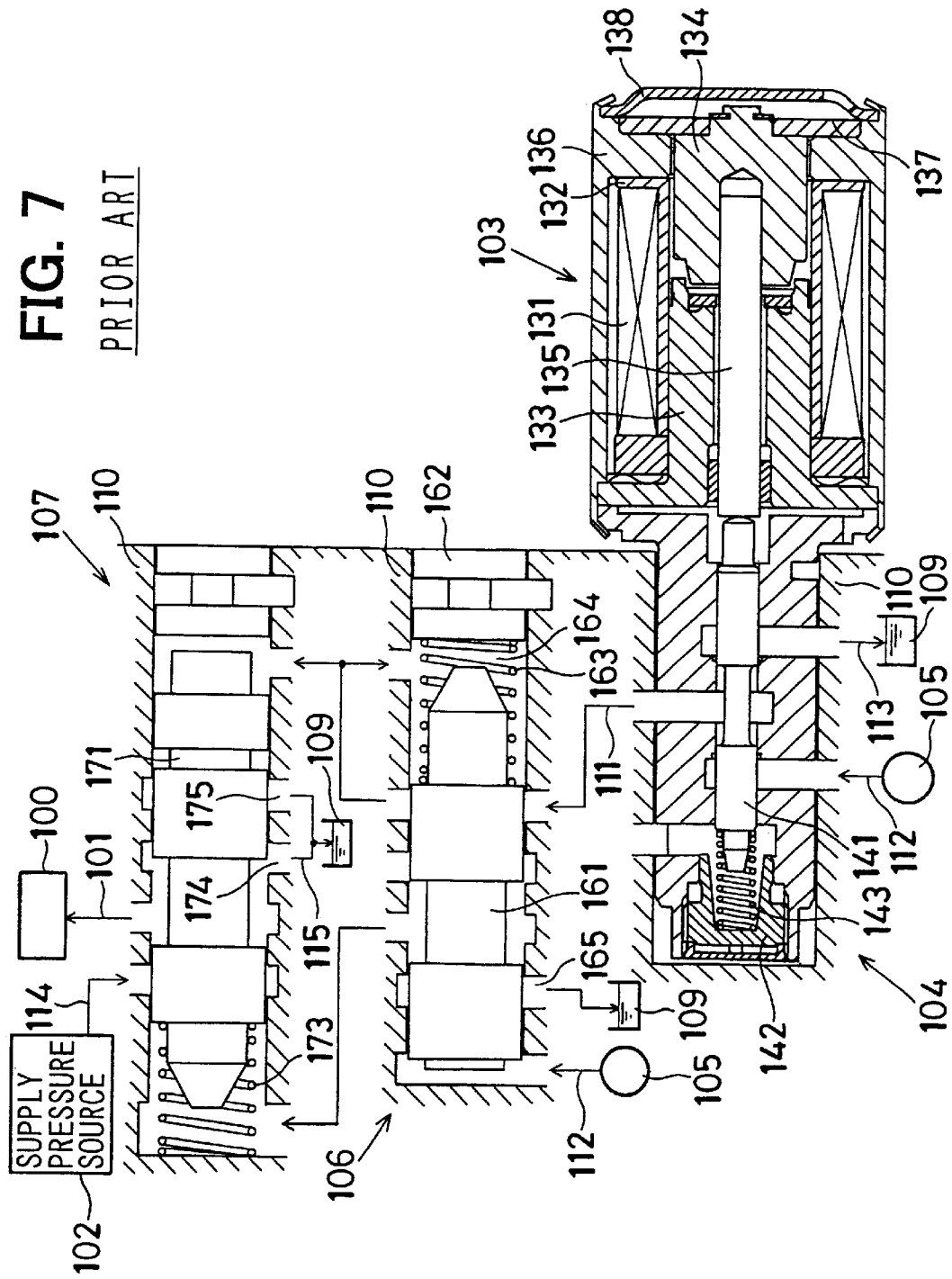
FIG. 7 is a circuit diagram showing a conventional hydraulic circuit system as prior art

An electromagnetic valve in which a pressure regulation valve and a pilot pressure control valve are integrated into a body according to a third embodiment is described with reference to FIG. 6.

According to the third embodiment, the first plug 61 is provided at outer circumference thereof with a male thread portion (outer circumferential thread) that is engaged with a female thread (inner circumferential thread) formed on the other end inner circumferential surface of the first housing 2a. The first plug 61 is fastened and fixed to the other end inner circumferential surface of the first housing 2a. The first plug 61 is provided in a center thereof with a communicating bore 71 communicating opposite second drain ports 22 with each other.

The second plug 62 is provided at outer circumference thereof with a male thread portion (outer circumferential thread) that is engaged with a female thread (inner circumferential thread) formed on the other end inner circumferential surface of the first housing 2a. The second plug 62 is provided in a center thereof with a communicating bore 72 communicating the opposite pilot pressure hydraulic chambers 63 with each other.

The hydraulic engagement member may be a conical clutch or a hydraulic multiple disk clutch that enables mutual engagement of components constituting a planetary gear device arranged between the input and output axes of the automatic transmission, a hydraulic conical clutch, a hydraulic multiple disk clutch or a band brake that enables to engage any of the components with the output or input axis, or a hydraulic multiple disk brake which enables to fix any of the components to a fixing member of an automatic transmission case.

Instead of using the hydraulic servo 94 for driving to engage the hydraulic multiple disk clutch, the hydraulic servo may be used for driving to operate the band brake or the hydraulic multiple disk brake. Further, instead of using the output conduit mentioned above for communicating the pressure regulation valve with the hydraulic servo for driving the hydraulic multiple disk clutch of vehicle automatic transmission, the output conduit may be used to communicate the pressure regulation valve with a hydraulic servo for driving the band brake or the hydraulic multiple disk brake.

What is claimed is:

1. A pressure regulation valve for a hydraulic circuit having a supply pressure source and a drain, comprising:

a housing having an input port to communicate with the supply pressure source, an output port to communicate with the hydraulic circuit and at least a drain port to communicate with the drain;

a pilot pressure producing member supplying pilot pressure, which increases from zero to a value exceeding a given value, to the housing;

a pipe shaped first spool accommodated slidably in the housing so as to receive the pilot pressure, the first spool being moved therein by first thrust force due to the pilot pressure so that the output port communicates internally with the drain port, when the pilot pressure is substantially zero, and communicates internally with the input port, when the pilot pressure exceeds the given value;

a first biasing member giving the first spool a biasing force acting in an opposite direction to receiving the pilot pressure;

a feedback hydraulic chamber provided in the housing;

a second spool accommodated slidably inside the first spool so as to receive the pilot pressure, the second spool being movable therein by second thrust force due to the pilot pressure so that the feedback hydraulic chamber communicates internally with the output port, when the pilot pressure is below the given value, and communicates internally with the drain port, when the pilot pressure exceeds the given value; and a second biasing member giving the second spool second biasing force acting in an opposite direction to receiving the pilot pressure, wherein the feedback hydraulic chamber gives the first spool feedback force acting in an opposite direction to which the first spool receives the pilot pressure when the feedback hydraulic chamber communicates with the output port.

2. A pressure regulation valve according to claim 1, wherein the first spool moves in the housing to a position where the first thrust force balances with a sum of the first biasing force and the feedback force so that, when the pilot pressure is within a range from substantially zero to the given value, a normal output pressure proportional to the pilot pressure is supplied from the output port to the hydraulic circuit, and, when the pilot pressure is in a range exceeding the given value, a maximum output pressure equal to supply pressure of the supply pressure source, which is higher by a predetermined value than the normal pressure, is supplied from the output port to the hydraulic circuit.

3. A pressure regulation valve according to claim 2, wherein the first spool is provided with an axially extending bore, an inner output port through which the axially extending bore communicates with the output port, a feedback port through which the feedback hydraulic chamber communicates with the axially extending bore, and an inner drain port through which the axially extending bore communicates with the drain port.

4. A pressure regulation valve according to claim 3, wherein the second spool is slidably housed in the axially extending bore, the second spool keeping an initial position so that the feedback hydraulic chamber communicates via the feedback port, the axially extending bore and the inner output port with the output port, when the pilot pressure is within a range from substantially zero to the given value and the second thrust force is below the second biasing force, and moving in a direction to which the pilot pressure receives so that the feedback hydraulic chamber communicates via the feedback port, the axially extending bore and the inner drain port with the drain port, when the pilot pressure is in a range exceeding the given value and the second thrust force exceed the second biasing force.

5. A pressure regulation valve according to claim 1, wherein the pilot pressure producing member is a pilot pressure control valve being provided with a third spool that is arranged coaxially with the first spool and a valve housing formed integrally with the housing.

6. A pressure regulation valve according to claim 1, wherein the hydraulic circuit has a hydraulic servo for driving a hydraulic engagement member so as to select any one of transmission stages having a plurality of different transmission ratio arranged between input and output axes of a vehicle automatic transmission, the output pressure being applied to the hydraulic servo.

* * * * *